United States Patent [19]

Knepler

[11] Patent Number: 5,647,055

[45] Date of Patent: Jul. 8, 1997

[54] METHOD FOR CYCLICALLY DISPENSING WATER FROM A HEATED WATER APPARATUS

[75] Inventor: John T. Knepler, Chatham, Ill.

[73] Assignee: Bunn-O-Matic Corporation, Springfield, Ill.

[21] Appl. No.: 628,019

[22] Filed: Apr. 4, 1996

Related U.S. Application Data

[62] Division of Ser. No. 533,637, Sep. 25, 1995.

[51] Int. Cl.[6] .................................. F24H 1/20; H05B 3/78
[52] U.S. Cl. ........................ 392/451; 392/450; 392/445; 392/466; 99/280
[58] Field of Search ........................ 392/451, 449, 392/458, 459, 460, 461, 462, 463; 137/391, 395, 396, 397, 398, 399; 251/129.05; 99/280, 295, 283

[56] References Cited

U.S. PATENT DOCUMENTS

| 2,643,322 | 6/1953 | Lime et al. | 392/451 |
|---|---|---|---|
| 3,443,508 | 5/1969 | Reynolds et al. | 99/280 |
| 4,757,182 | 7/1988 | Albrght | 392/451 |
| 4,917,005 | 4/1990 | Knepler | 99/280 |
| 4,978,833 | 12/1990 | Knepler . | |
| 5,000,082 | 3/1991 | Lassota | 392/451 |
| 5,019,690 | 5/1991 | Knepler . | |
| 5,285,717 | 2/1994 | Knepler | 392/451 |
| 5,331,885 | 7/1994 | Lassota | 99/283 |
| 5,375,508 | 12/1994 | Knepler et al. | 99/280 |
| 5,435,145 | 7/1995 | Jaster | 251/129.05 |

FOREIGN PATENT DOCUMENTS

| 52-051141 | 4/1977 | Japan . |
|---|---|---|
| 52-072958 | 6/1977 | Japan . |

*Primary Examiner*—Tu B. Hoang
*Attorney, Agent, or Firm*—Trexler, Bushnell, Giangiorgi & Blackstone, Ltd.

[57] ABSTRACT

A heated water apparatus which includes a reservoir for retaining a quantity of heated water and a controller for controlling the heated water apparatus. A controllable heater is coupled to the controller and the reservoir for controllably heating the water retained in the reservoir. A water sensor is coupled to the reservoir and to the controller for detecting the presence and absence of a desired quantity of water in the reservoir and providing a signal to the controller. The controller controls a water source which controllably admits water to the reservoir. The controller also controls an outlet valve coupled to the reservoir. The controller operates the inlet valve and the outlet valve to control the flow of water through the outlet valve in response to the presence and absence of water in the reservoir. When the water level is too low, the controller cycles the outlet valve for specific periods of time in order to allow the water level of the reservoir to catch up. During the cycling time, a controller decrements a predetermined flow time in order to dispense a consistent and repeatable quantity of water from the reservoir to a brewing substance.

5 Claims, 4 Drawing Sheets

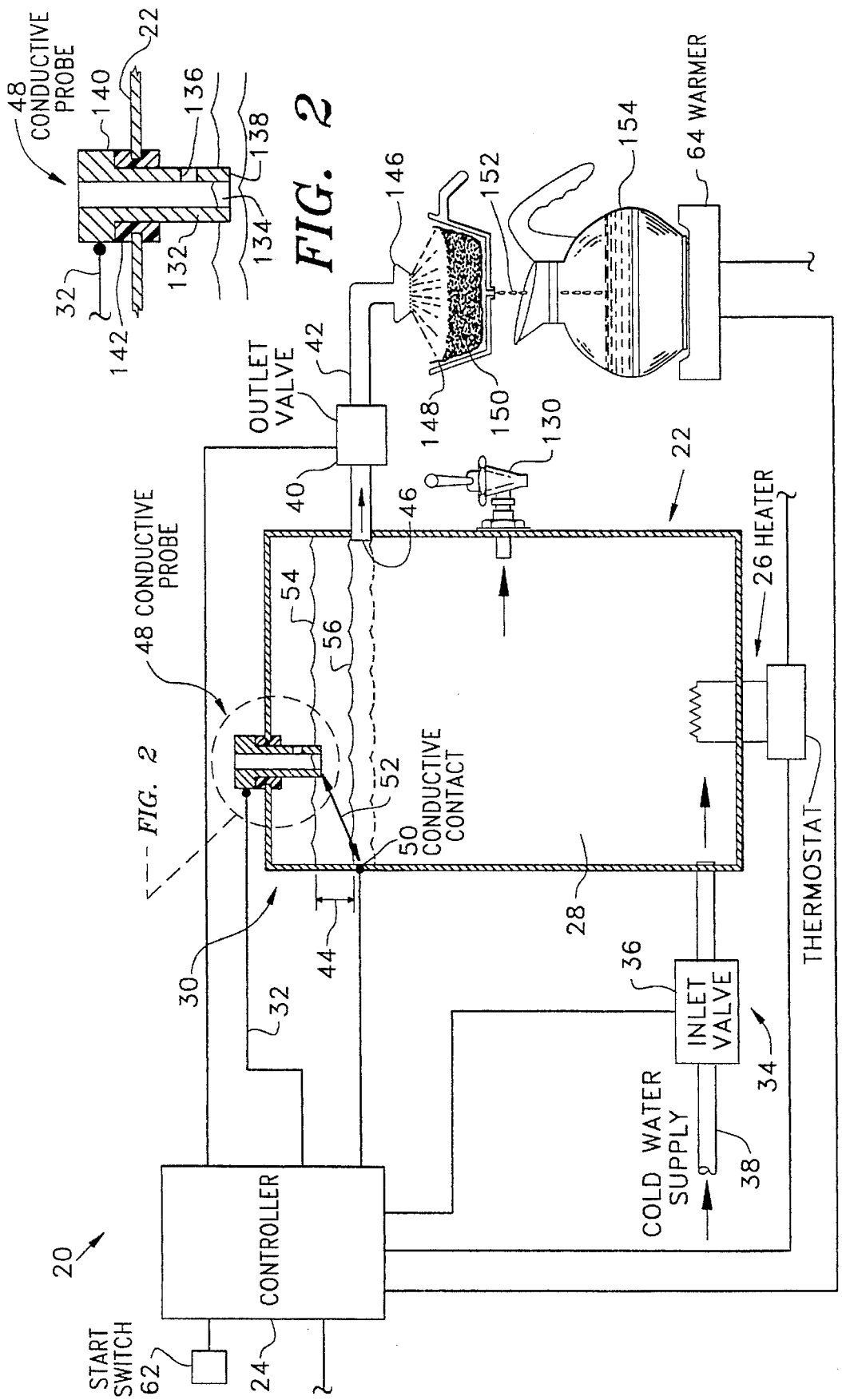

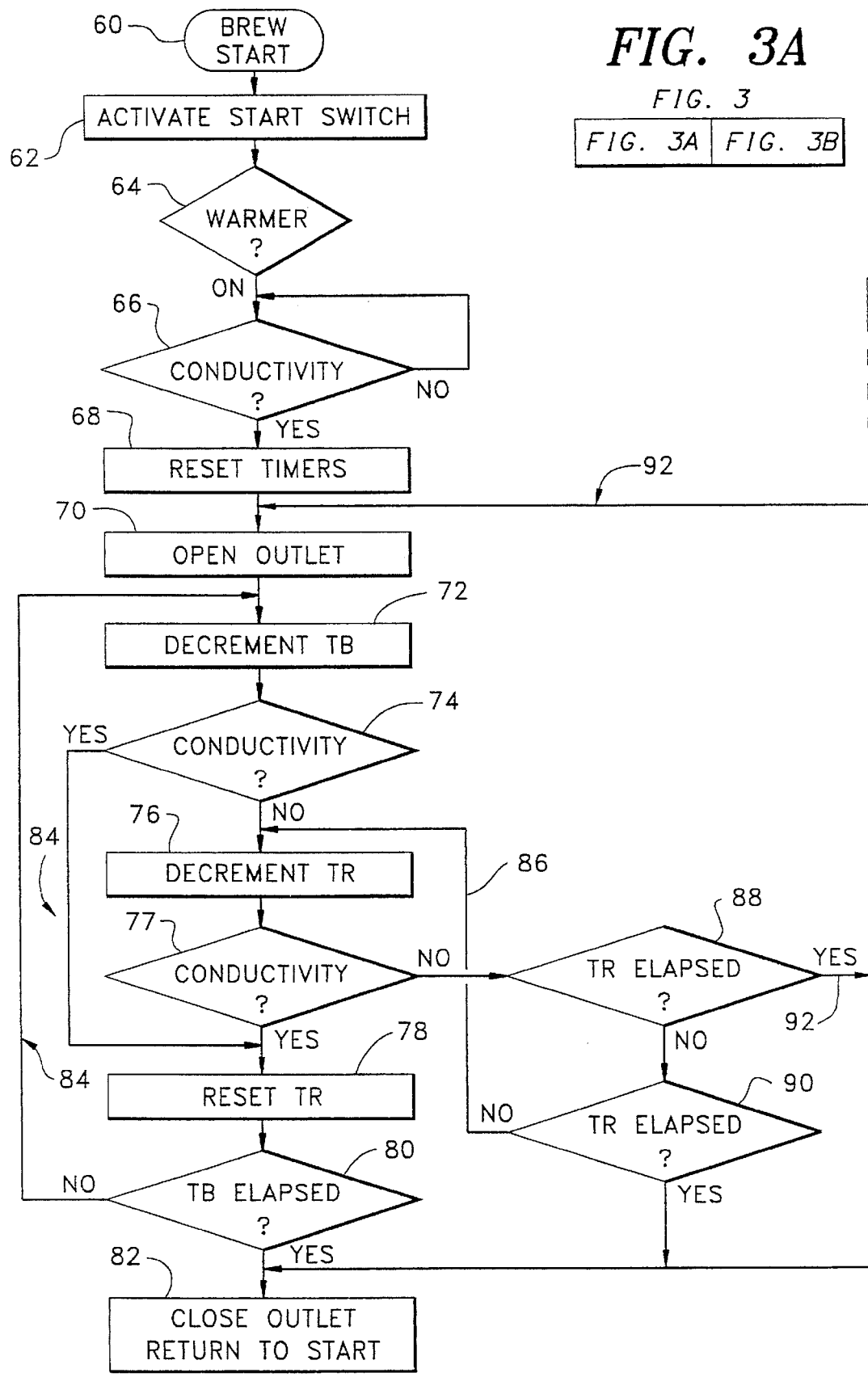

METHOD FOR CYCLICALLY DISPENSING WATER FROM A HEATED WATER APPARATUS

CROSS REFERENCE

The present application is a Divisional application of copending U.S. patent application Ser. No. 08/533,637, filed Sep. 25, 1995.

BACKGROUND

The present invention relates to a heated water apparatus which maintains a water flow throughout a brew cycle. The present invention also includes a venting conductive probe for use in the heated water apparatus.

A variety of brewing devices have been devised in order to quickly and efficiently brew a brewed beverage by infusing a beverage brewing substance with heated water. These brewing devices often include a heated water reservoir which maintains water at a desired brewing temperature and which includes a heater coupled to the reservoir for heating water retained therein. A variety of devices employ a displacement heated water apparatus or a gravity induced flow heated water apparatus. In the displacement heated water apparatus, water is introduced into the reservoir which displaces heated water retained therein. Displaced heated water flows through a heated water line and is delivered to a funnel which retains a beverage brewing substance therein. Water can be displaced by manually placing water into a basin communicating with the reservoir or by providing an automatic water source which controllably admits a desired a quantity of water to the reservoir. In the displacement system, an equal quantity of water is displaced from the reservoir.

A gravity system employs a head of water above the heated water line which provides hydraulic pressure to move water through the heated water line. Typically, in such a device, a controllable valve is attached to the heated water line. When a brew cycle is initiated, the valve is opened to allow the head to force a desired quantity of water out through the heated water line for infusing a beverage brewing substance retained in a funnel. Additionally, a faucet may be provided on the reservoir for dispensing a quantity of heated water from the reservoir for other uses such as preparing instant foods, small quantities of hot beverages, as well as many other uses.

An important consideration in brewing a beverage is to assure that the beverage will be brewed to provide desired characteristics such as flavor, color, aroma, temperature and consistency quickly, efficiently and with a high degree of repeatability. In order to achieve these goals, it is desirable to provide an automated system so as to minimize the degree of human intervention in the process and thereby increase the predictability and reliability of the system. In this regard, the gravity type system provides a controllable inlet valve on the water source and a controllable outlet valve on the heated water line. The inlet valve and outlet valve are generally simultaneously controlled such that water flowing through the inlet line flows simultaneous with the outflow of water through the heated water line.

A problem arises however when a heated water apparatus or brewing device has an insufficient flow rate or inconsistent flow rate. Many food preparation facilities may not have sufficient water supply in order to maintain consistent pressure or flow rate through an inlet line. If the in flow rate is insufficient or inconsistent, a proper level of water will not be maintained in the reservoir and the head of the reservoir may be dissipated to a degree that water will not be dispensed through the heated water line. If this happens, the brew cycle may be interrupted or prematurely terminated resulting in inconsistency in the brewed beverage.

For example, if the water supply is not sufficient to recharge the reservoir during a brew cycle and the head drops below the heated water line, the brewing cycle may be interrupted and an insufficient quantity of water will be used during the brewing process. This will result in a substantial variation in the extraction, consistency and resulting flavor of the brewed beverage. Further, if the flow rate through the inlet line is inconsistent and the inlet valve operates on a timed cycle, an insufficient quantity of water will flow into the reservoir resulting in decreased head for a brewing cycle in progress. Although the initial brewing cycle may produce the desired beverage results, the cumulative effect of insufficient recharging of the reservoir will result in a drop in the water level. If the water level in the reservoir is not maintained at a desired level, there will be insufficient head for infusing a beverage brewing substance. Therefore, there is a need to provide an apparatus which provides consistent high quality brewed beverage which prevents depleting the quantity of water retained in the heated water reservoir.

OBJECTS AND SUMMARY

A general object satisfied by the claimed invention is to provide a heated water apparatus which dispenses a desired quantity of heated water even when the water supply is insufficient or inconsistent.

Another object satisfied by the claimed invention is to provide a beverage brewing apparatus which produces a consistent beverage brewing substance.

Still a further object of the claimed invention is to provide a venting conductive probe for use in sensing the presence and absence of water in the reservoir.

Briefly, and in accordance with the foregoing, the present invention envisions a heated water apparatus which includes a reservoir for retaining a quantity of heated water and a controller for controlling the heated water apparatus. A controllable heater is coupled to the controller and the reservoir for controllably heating the water retained in the reservoir. A water sensor is coupled to the reservoir and to the controller for detecting the presence and absence of a desired quantity of water in the reservoir and providing a signal to the controller. The controller controls a water source which controllably admits water to the reservoir. The controller also controls an outlet valve coupled to the reservoir. The controller operates the inlet valve and the outlet valve to control the flow of water through the outlet valve in response to the presence and absence of water in the reservoir. When the water level is too low, the controller cycles the outlet valve for specific periods of time in order to allow the water level of the reservoir to catch up. During the cycling time, a controller decrements a predetermined flow time in order to dispense a consistent and repeatable quantity of water from the reservoir to a brewing substance.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which:

FIG. 1 is a general, diagrammatic illustration of a heated water apparatus employing a control system and a venting conductivity probe of the present invention;

FIG. 2 is an enlarged, partial fragmentary, cross-sectional side elevational view of the venting conductivity probe shown in FIG. 1;

FIG. 3 including FIGS. 3A and 3B is a flow chart of the operation of the brewing logic of the present invention.

DESCRIPTION

Figure 3B:
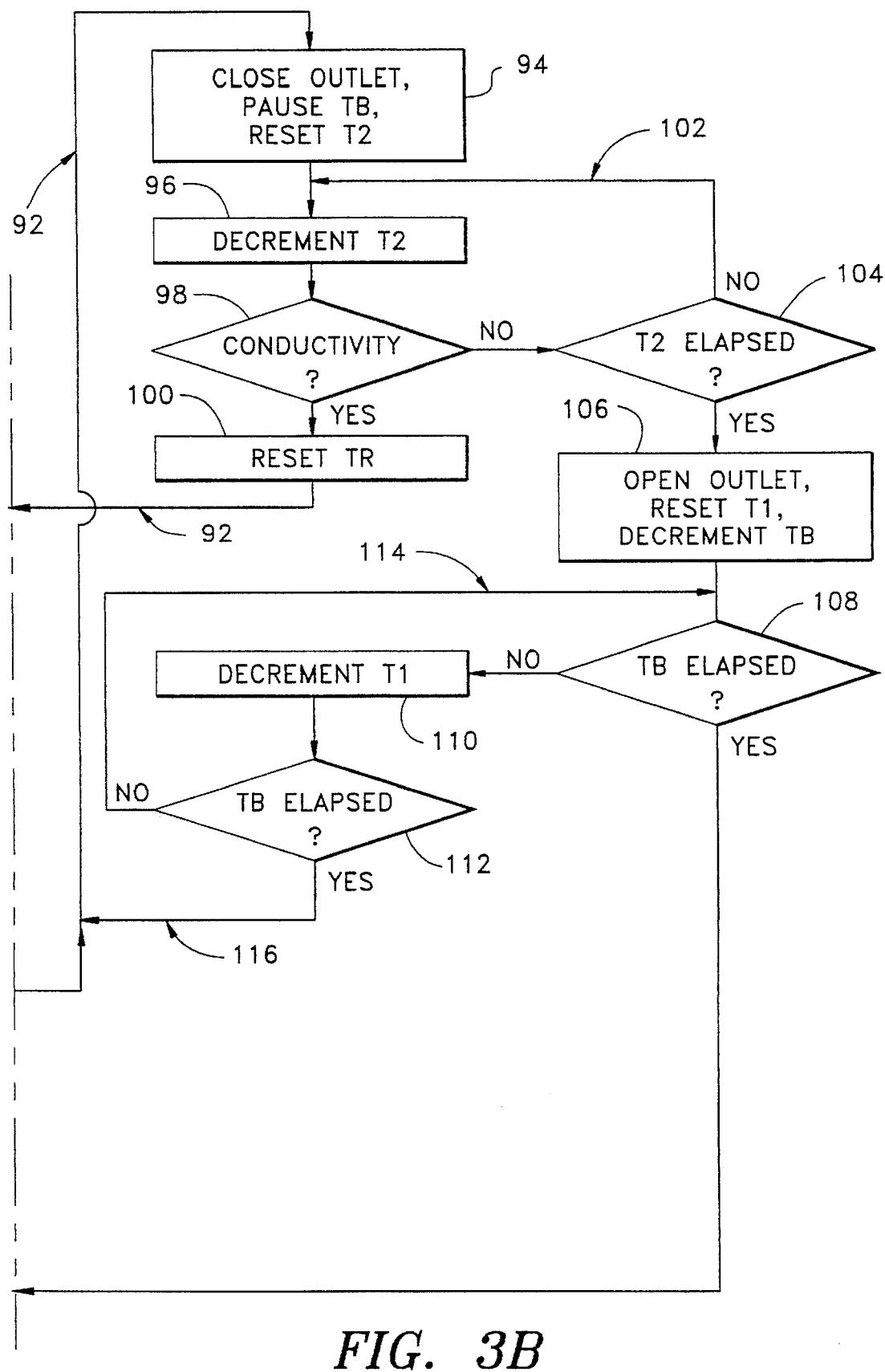

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

With reference to FIG. 1, the present invention includes a heated water apparatus 20 having a reservoir 22 and a controller 24 for controlling the apparatus 20. A heater 26 is coupled to the reservoir 22 and to the controller 24 to controllably heat water 28 retained in the reservoir 22. A water sensor 30 is coupled to the reservoir 22 and to the controller 24 for at least detecting the presence and absence of a desired quantity of water 28 in the reservoir 22. The water sensor 30 provides a signal over lines 32, 33. A water source 34 is coupled to the reservoir 22 to introduce water into the reservoir 22. The water source 34 includes a controllable inlet valve 36 which is coupled to an inlet line 38 and the controller 24. An outlet valve 40 is coupled to an outlet line or heated water line 42 which communicates with the reservoir 22. The controllable outlet valve 40 is coupled to the controller 24.

A quantity of water 28 is retained in the reservoir 22 and it is desirable to maintain a head 44 of the water 28 above the port 46 of the heated water line 42. The water detector assembly 30 includes a first sensor 48 and a second sensor 50. The first and second sensors 48,50 are generally positioned relative to the reservoir 22 for detecting the desired level of head 44. In this regard, the first sensor 48 is a conductive probe which extends into the reservoir and the second sensor 50 is a conductive contact which contacts the water 28 in the reservoir 22. Conductivity will be sensed by the first and second sensors 48,50 when water contacts both the first and second sensors 48, 50 allowing conductivity in a gap 52 therebetween. When the water level is at a first desired level 54, conductivity will be sensed between the sensors 48,50 thereby indicating a desired quantity of water is retained in the reservoir 22. When the water level drops to a second level 56, the first sensor 48 does not contact the water and therefore conductivity is not sensed in the gap 52. The sensing of the presence and absence of the water at the desired level 54 provides a signal to the controller 24 which is employed in operating the heated water apparatus 20.

Generally, in the use of the present invention, the water detector assembly 30 will indicate whether the water level is at the desired level 54 or below the desired level 54. Upon initiating a brew cycle, the controller 24 will determine whether the quantity of water in the reservoir 22 is at the desired level 54. If conductivity is sensed, the controller 24 will interpret the water as being at the desired level and the controller 24 will open the inlet valve 36 and the outlet valve 40. It is desirable to maintain the water level generally consistent throughout the brewing cycle so as to maintain desired quantity of water in a heated condition and to maintain a generally consistent flow through the heated water line 42. A generally consistent flow through the heated water line 42 will provide a predictable and generally consistent brewed beverage. The water source 34 provides water at a flow rate through the inlet line and the inlet valve 38,36 at a rate which is generally equal to or slightly greater than the outflow rate through the outlet valve 40 and the heated water line 42.

During the brewing process, the inlet valve 36 is operated to allow water to flow through the inlet line 38 into the reservoir 22 for a predetermined period of time. The period of time is dependent upon the quantity of beverage to be brewed as selected by the operator at the controller 24. Additionally, the controller 24 may be configured to provide adjustable input devices such that the period of time which the inlet valve 36 is opened may be adjusted depending on the user's preferences and experience. For example, if a user desires to increase or decrease the strength of the brewed product, the controller 24 will provide adjustment mechanisms to adjust the dwell time, the inlet valve 36 and store the dwell time for future use. Generally, the outlet valve 40 will be controlled for the same period of time. However, the inlet valve 40 may be controlled by the controller 24 for a shorter period of time, especially if the inflow rate through the inlet line 38 is greater than the outflow rate through the heated water line 42.

Figure 4:
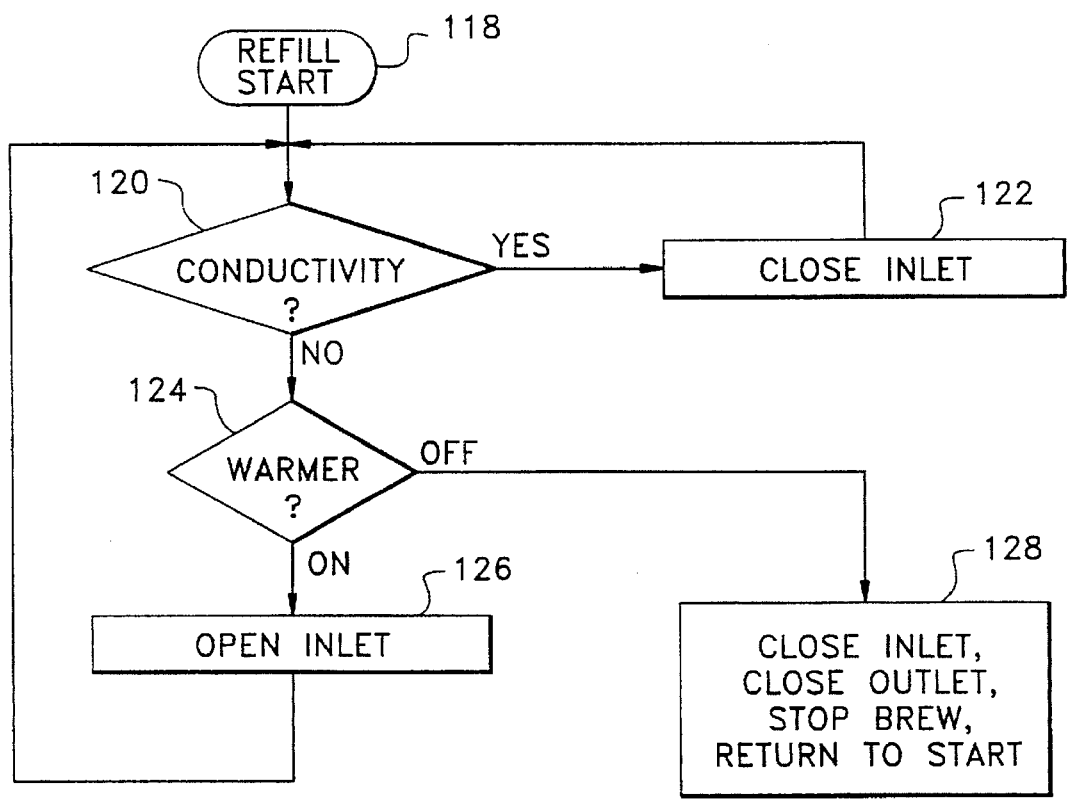
FIG. 4 is a flow chart of the refill logic of the present invention.

With further reference to FIGS. 3 and 4, we discuss herein the flow charts for a brewing cycle (See, FIG. 3) and a refill cycle (See, FIG. 4). In a brewing cycle, the first step is to initiate the brewing cycle (60) by activating a start switch 62. Once the start switch 62 is activated, the controller 24 will determine whether or not a warmer 64 is activated or deactivated. If the warmer 64 is active, the controller 24 will test for conductivity using the water detector assembly 30. If the warmer 64 is not active, the controller 24 will indicate that the warmer 64 should be activated.

The conductivity check will employ a signal from the water detector assembly 30 to determine whether water is contacting both the first and second sensors 48,50. If water is at a desired level 54, conductivity will be sensed across the conductivity sensor gap 52 and timers 68 in the controller 24 will be reset. After resetting the timers, the outlet valve 40 will be opened (70) and a brewing time timer will start to be decremented (72). During the decrementing of the brewing time timer (72), the conductivity will be checked by the controller 24 using the water detector assembly 30. If conductivity is not sensed, for example, the first and second sensors 48, 50 do not detect the presence of water, a second timer is initiated and decremented (76) to time a period which has been set to refill the tank to raise the water level to the point where it contacts the first probe 48. While decrementing the second timer TR (76), the water detector assembly 30 will check for conductivity in the gap 52. If conductivity is detected (i.e. the water is at a desired level), the refill timer TR is reset (78). The brewing time timer TB will be polled to determine whether or not the allotted time has elapsed (80). If the allotted time (80) has elapsed, the water outlet 40 will close (82) until a subsequent brew cycle is initiated.

If the elapsed time TB (80) has not elapsed, TB will be decremented (72) and continue through the aforementioned cycle. Conductivity will be checked (74) with the timer TR (78) being reset if conductivity is sensed until the brewing time is completely elapsed (80).

The foregoing description generally sets forth a typical brewing cycle as defined by a full reservoir brewing time loop or TB loop 84. However, if there is a low water condition in the reservoir for any reason a number of alternate loops may be followed according to the present invention. A first low-water loop 86 will be followed when there is no conductivity sensed and when the first time-out period allotted to refill the tank or TR 88 has not elapsed and the brewing time or TB 90 has not elapsed. This loop 86 is repeated until the refill time TR 88 has elapsed or until the refill time TR 88 has not elapsed and the brew time TB 90 has elapsed, If the brew time TB has elapsed, then the outlet 40 is closed and the brew logic is returned to the start mode (82).

If during the first low-water loop 86 the refill time TR 88 has elapsed, a second low-water loop 92 is initiated. The second low-water loop 92 results in closing 94 the outlet 40, pausing the brew time TB timer and resetting a second refill time T2. The second refill time T2 is decremented 96 and conductivity is checked 98. If conductivity is sensed the refill timer is reset 100. If conductivity is not sensed, a refill dwell loop 102 is initiated whereupon the second refill time is checked 104 and if it has not elapsed the second refill time T2 is decremented 96 and conductivity is checked 98. If conductivity is sensed, the refill timer is reset 100 and the outlet is opened 70. If conductivity is not sensed, the second refill timer is again checked 104 and decremented 96.

Continuing with the second low-water loop 92, once the second refill time T2 104 has elapsed, the outlet 40 will be opened 106 with a refill timer T1 being reset and the brew timer TB being restarted and decremented. The brew time is checked 108 to determine whether the brewing time has elapsed. If the brewing time has elapsed, the outlet 40 will be closed and the system will return to the start mode (82). If the brew time has not elapsed, the outlet timer T1 will be decremented 110 and checked 112. Checking the brew time 108, decrementing the outlet timer T1 110 and checking whether or not the outlet timer T1 has elapsed 112 defines an outlet open loop 114 which is repeated until the outlet timer T1 112 has elapsed. Once the outlet timer T1 has elapsed 112, the outlet 40 is closed 94 with the brew timer being paused and the second refill timer T2 being reset.

The steps of opening and closing the outlet, checking all the timers and sensing conductivity define a third low-water loop 116. The third low-water loop 116 is different from the second low-water loop 92 such that conductivity in the third low-water loop 116 is not sensed whereas in the second low-water loop 92 conductivity is eventually sensed. In other words, in the third low-water loop 116, the reservoir never "catches-up" whereas in the second low-water loop 92 the reservoir does "catch-up" at some point because conductivity is sensed. The second low-water loop 92 is exited upon sensing conductivity 98. The third low-water loop 116 is exited upon expiration of the brew time 108. Similarly, the first low-water loop 86 is exited upon elapsing of the brew time TB 90 or upon expiration of the first refill time TR 88. Elapsing of the refill time TR 88 during the first low-water loop 86 results in merging with the second low-water loop 92 or the third low-water loop 116.

In summary, the present invention senses conductivity, and opens and closes the outlet 40 in response to the conductivity and the timers TB, T1 and T2. Each of the time period associated with the timers TB, TR, T1 and T2 can be selectively set by an operator. These timers are of known construction and include manual control to increment or decrement the time of each timer. For example, in the present invention the brewing time TB is set as 150 seconds, the first refill time out period TR has been set as 30 seconds, with the outlet open time T1 and second refill time T2 being set at ten seconds each. Further, the ten second cycles of the open outlet T1 and the second refill time T2 provide a pause and recover cycle. The reservoir is allowed to recover during the ten seconds of the second refill time period T2 during which the outlet 40 is closed. Further, there is a fixed one-second delay following detection of a drive probe during which the refill time period TR is decremented 76 and conductivity is rechecked 77. If there has been a slight decrease in the volume of the reservoir, and the one second delay allows the reservoir to catch up, the conductivity check 77 will sense conductivity and the refill time period TR will be reset 78.

The present invention also includes refill logic (see FIG. 4) which operates concurrently with a brew cycle as set forth in FIG. 2. The refill logic is initiated 118 once the apparatus is set up. After initiating the refill logic 118, the water detector assembly 30 checks for conductivity 120 in the reservoir. If conductivity is detected, the inlet remains closed 122. The conductivity is checked 120 periodically. When conductivity is not sensed 120, the refill logic next checks for activation of the warmer 124. If the warmer is on and there is no conductivity 124, 120, the inlet valve 36 is opened 126. Once the inlet is opened 126 conductivity is checked and the warmer is checked. Once conductivity is sensed, the inlet 36 is closed 122. If at any time during the refill cycle the warm is deactivated the inlet and outlet 36, 40 are closed and the brewing cycle is stopped. Coupling the warmer to the refill logic and to the brewing logic provide a means to terminate a brewing cycle at any time. This provides an extra safeguard to allow a user to turnoff the entire apparatus.

The outlet 40 will not be opened after initiating a brew start 60 until the reservoir is at a desired level 54. This will compensate for overnight evaporation or faucet usage which might drain the reservoir or force the brew cycle into one of the low-water loops 86, 92, 116 described hereinabove. Further, an additional safeguard is provided by limiting the open activation of the inlet valve to a predetermined time, such as six minutes, to prevent flooding in the case of a defective water sensing assembly 30.

It should be noted, that the present invention maintains a generally consistent flow rate to the heated water line 42 even if a user draws water from the reservoir 22 through a faucet 130 during the brew cycle. The present invention is advantageous in that it provides a pause and recover cycle by way of the first and second low-water loops 86, 92. If a quantity of water is drawn through the faucet 130 which prevents sensing conductivity by the water detecting assembly 30, the pause and recover cycles allow a recovery time to recharge the reservoir 22. This is very useful in that often small quantity of water may be drawn through the faucet 130 during a brew cycle. While these quantities are relatively small, they should not interfere with a brewing cycle.

Even if a larger quantity of water is removed from the reservoir 22 during a brewing cycle, the present invention provides for alternating or cycled opened and closed conditions of the outlet valve in an attempt to recharge the reservoir without significantly changing the flow rate of water through the beverage brewing substance.

The present invention also includes improvements to the first sensor 48 of the water detector assembly. As shown in FIG. 1, the first sensor 48 is a venting conductivity probe which is axially elongated having a wall 132 defining a first vent passage 134. The first vent passage 134 communicates with both the reservoir 22 and the ambient atmosphere for venting atmosphere from the reservoir 22 to the ambient atmosphere. A second vent passage 136 is formed in the wall 132 of the probe communicating with the first vent passage 134. The second vent passage 136 is spaced upwardly along the wall 132 away from a mouth 138 of the probe to provide an atmosphere venting passage when water in the reservoir 22 covers the mouth 148 of the first vent passage 134. The probe 48 has a portion 140 which extends from the reservoir 22. This extending portion is a conductive material which is connected to line 32 to provide a signal connection to the controller 24. In an embodiment where the reservoir 22 is formed of a conductive material such as metal, a non-conductive gasket 142 is positioned between the outside of the probe and the adjoining surface of the reservoir body 22. In an embodiment where the reservoir 22 is formed of a non-conductive material, the non-conducting gasket 142 may be eliminated. However, in an embodiment where the reservoir 22 is a non-conductive material, the second sensor must be attached to the reservoir so that at least a portion of the second sensor 50 contacts the water 28 in the reservoir 22.

In use, the present invention promotes the operation of a heated water device 20 even when the flow rate is inconsistent or inadequate. The present invention provides controlled operation of an inlet valve 36 and outlet valve 40 by sensing the presence or absence of a desired level of water in the reservoir 22. If the water detecting assembly 30 senses the presence of a desired quantity of water (i.e. water level 54) the controller 24 will open the outlet valve 40 during a brew cycle. The inlet valve 36 will also be opened to introduce water into the reservoir 22 to make up for the water which is drawn off through the heated water line 42. When there is a sufficient flow rate through the inlet line 38 and inlet valve 36, water is dispensed generally continuously through the heated water line 42, through a sprayhead 146, and into a funnel 148 which retains a beverage brewing substance 150. A brewed beverage 152 is then dispensed into a decanter 154 which is positioned on the warmer 64. As noted hereinabove, it is desirable to couple the operation of the warmer 64 to the controller 24 such that the warmer 64 provides an override control function.

If, for any reason, the water level drops during a brew cycle, the controller 24 will react to the drop in water by sensing conductivity and monitoring the time period and the duration of the low-water condition. If the low-water condition persists for a predetermined period of time (i.e., the first refill time period TR) the controller will enter into a second or third low-water loop cycle 92, 116. During these loops 92, 116 the conductivity will be checked and timers will be reset, decremented and monitored which provides limits and criteria for operating the outlet valve 40. If, during the brew cycle, conductivity is sensed (water is present in the reservoir at the desired level) the outlet valve 40 will be activated to allow heated water to flow through the heated water line 42. If, during the duration of the brew time, the reservoir never "catches up", the outlet valve 40 will be cycled opened and closed. The opening and closing of the outlet valve 40 results in decrementing the brew time during the open period and pausing the brew time during the closed period. While the outlet valve 40 is closed, the inlet valve 36 will remain open in order to attempt to allow the reservoir 22 to be recharged.

The opening and closing of the outlet valve 40 extends the total time from pushing the start button 62 to completion of the brewing cycle. The actual flow time of the water through the beverage brewing substance 148, however, is generally consistent. In this regard, the cycle period for opening and closing the outlet valve 40 is selected to maintain a generally consistent and continuous flow from the funnel 148. This is advantageous in that it maintains a generally consistent infusion to produce a consistent extraction even during the low-water periods as well as providing an indication that the brewing process is ongoing. Even during low-water period the continuous flow of brewed substance 152 into the decanter 154 indicates to a user that the brewing cycle is not over. In contrast, prior art devices may cycle the outlet valve 40 off until the reservoir 22 is fully recharged. This results in stopping the outflow stream of brewed substance 152 into the decanter 154 thereby indicating to a user that the brewing process is over. If the brewing continues while the decanter 154 is removed from the warmer 64, the hot brew will flood the warmer 64 requiring cleanup and possible repair.

The present invention also requires that conductivity be sensed by the water detector assembly 30 before the brew cycle can actually be initiated. In this regard, the head 44 in the reservoir 22 is calculated in order to provide a predetermined quantity of water. For example, it may be desirable to maintain a head 44 of at least one brew cycle of water. In this regard, even if the reservoir 22 never "catches up" there is sufficient water in order to complete the brew cycle. A subsequent brew cycle cannot be initiated until conductivity is detected (see the conductivity sensing step 66 as shown in FIG. 2). Once conductivity is detected, there is at least a sufficient quantity of water for completing the brew cycle. Additionally, having one to two brew cycles of water retained in the head 44 will allow some water to be drawn off through the faucet 130 without interfering with the brew cycle.

While a preferred embodiment of the present invention is shown and described, it is envisioned that those skilled in the art may devise various modifications and equivalents without departing from the spirit and scope of the appended claims. The invention is not intended to be limited by the foregoing disclosure.

The invention claimed is:

1. A method of controllably dispensing water from a heated water apparatus having a reservoir for retaining a quantity of water, a controller for controlling said heated water apparatus, a controllable heater coupled to said controller and to said reservoir for controllably heating said water retained in said reservoir, a water sensor coupled to said reservoir and to said controller for at least detecting the presence and absence of a desired quantity of water in said reservoir and providing a signal to said controller, an inlet valve coupled to said controller for controlling the flow of water from a water source to said reservoir, and a controllable outlet valve communicating with said reservoir and coupled to said controller for controllably dispensing water from said reservoir, said method comprising the steps of:

activating said heated water apparatus to dispense water from said reservoir;

sensing the presence or absence of water in the reservoir;

controlling said controllable outlet valve to dispense water from said reservoir upon sensing the presence of the water in said reservoir at a predetermined level;

periodically sensing the level of water in said reservoir;

controllably operating said inlet valve for adding water to such reservoir;

closing said controllable outlet valve upon detecting the absence of water at a predetermined level in said reservoir;

controllably cycling said controllable outlet valve to dispense a quantity of water therefrom;

periodically sensing the presence of water in said reservoir at a predetermined level; and said controller controllably operating said inlet valve and said controllable outlet valve to control the flow of water through said controllable outlet valve in response to the presence and absence of water in said reservoir as detected by said water sensor.

2. A method of controllably dispensing water from heated water apparatus as recited in claim 1, further comprising: maintaining said controllable outlet valve in an opened condition upon sensing the presence of water in said reservoir at a predetermined level.

3. A method of controllably dispensing water from a heated water apparatus as recited in claim 2, further comprising periodically sensing the level of water in said reservoir upon opening said controllable outlet valve; and closing said outlet valve upon sensing that the water in said reservoir is below a desired level.

4. A method of controllably dispensing water from a heated water apparatus as recited in claim 1, further comprising:

cycling said controllable outlet valve opened and closed in response to sensing a low-water condition in said reservoir, said controllable outlet valve being opened for a predetermined period of time and closed for a predetermined period of time while maintaining said inlet valve in an open condition, periodically sensing the presence of water in said reservoir at a desired level while cycling said controllable outlet valve opened and closed.

5. A method of controllably dispensing water from a heated water apparatus as recited in claim 1, further including a warmer device for maintaining a quantity of beverage produced by heated water dispensed from said heated water apparatus in a heated condition, said heated water apparatus having a dispensing cycle during which heated water is dispensed through said outlet valve to divide water for infusing a beverage brewing substance, said method further comprising the steps of:

sensing the condition of said warmer by said controller upon initiating a dispensing cycle and continuing with and completing said dispensing cycle upon sensing the activation of said warmer.

\* \* \* \* \*

UNITED STATES PATENT AND TRADEMARK OFFICE
CERTIFICATE OF CORRECTION

PATENT NO.  : 5,647,055
DATED       : July 8, 1997
INVENTOR(S) : John T. Knepler It is certified that error appears in the above-indentified patent and that said Letters Patent is hereby corrected as shown below:

Column 10, Line 14  "divide"  should be -- provide --

Signed and Sealed this

Tenth Day of February, 1998

Attest:

BRUCE LEHMAN

Attesting Officer

Commissioner of Patents and Trademarks